United States Patent [19]

Song et al.

[11] Patent Number: 5,896,442
[45] Date of Patent: Apr. 20, 1999

[54] VOICE ANNOUNCEMENT TECHNIQUE OF AN ELECTRONIC EXCHANGE SYSTEM

[75] Inventors: Choon-Keun Song, Bucheon; Seung-Gu Kang, Seongnam, both of Rep. of Korea

[73] Assignee: SamSung Electronics Co., Ltd., Suwon, Rep. of Korea

[21] Appl. No.: 08/736,164

[22] Filed: Oct. 28, 1996

[30] Foreign Application Priority Data

Oct. 28, 1995 [KR] Rep. of Korea .................. 95 37904

[51] Int. Cl.$^6$ ...................................................... H04M 3/00
[52] U.S. Cl. ................................ 379/88.07; 379/88.16; 379/88.27; 704/258
[58] Field of Search ........................... 379/1, 9, 15, 67, 379/68, 71, 88, 89, 88.07, 88.16, 88.22, 88.27; 704/258, 260

[56] References Cited

U.S. PATENT DOCUMENTS

| | | | |
|---|---|---|---|
| 4,068,099 | 1/1978 | Mikkola et al. | 379/71 |
| 4,221,933 | 9/1980 | Cornell et al. | 379/89 |
| 4,357,493 | 11/1982 | Anderson et al. | 379/72 |
| 4,446,336 | 5/1984 | Bethel et al. | 379/76 |
| 4,545,043 | 10/1985 | Anderson et al. | 379/71 |
| 4,706,270 | 11/1987 | Astegiano et al. | 379/71 |
| 4,829,514 | 5/1989 | Frimmel, Jr. et al. | 379/89 |
| 5,054,054 | 10/1991 | Pessia et al. | 379/89 |
| 5,056,086 | 10/1991 | Libonati | 379/88 |
| 5,142,527 | 8/1992 | Barbier et al. | 379/88 |
| 5,222,124 | 6/1993 | Castaneda et al. | 379/67 |
| 5,349,636 | 9/1994 | Irribarren | 379/89 |
| 5,367,609 | 11/1994 | Hopper et al. | 704/278 |
| 5,479,498 | 12/1995 | Brandman et al. | 379/88 |
| 5,483,578 | 1/1996 | Ackermann et al. | 379/67 |
| 5,600,639 | 2/1997 | Kreten et al. | 379/88 |
| 5,633,909 | 5/1997 | Fitch | 379/15 |
| 5,652,828 | 7/1997 | Silverman | 704/260 |
| 5,696,811 | 12/1997 | Maloney et al. | 379/88 |

*Primary Examiner*—Daniel S. Hunter
*Attorney, Agent, or Firm*—Robert E. Bushnell, Esq.

[57] ABSTRACT

A voice announcement technique of an electronic exchange system having a main processor for controlling a voice announcement function and a time switch which switches a voice announcement message to a subscriber interface unit includes a voice memory for storing coded data corresponding to words and pauses; a processor interface unit connected to the main processor, for interfacing a voice announcement command output from the main processor; a buffer unit connected to the processor interface unit, for buffering information for performing a voice announcement with the main processor; a digital signal processing unit connected to the buffer unit, for controlling the voice memory to access corresponding words and pauses if the voice announcement command has been received, thereby reproducing a voice announcement message; and an output device connected to the time switch via a sub highway, for outputting the voice announcement message to the sub highway under the control of the digital signal processing unit.

46 Claims, 14 Drawing Sheets

1) MSG ID=2,3

| DF0 | DF1 | DF2 | DF3 |

→ DATE  ex) 01: TRANSMITTED AS "FIRST"
            10: TRANSMITTED AS "TENTH"
            FF: VOICE CORRESPONDING TO DATE IS NOT TRANSMITTED

→ MONTH ex) 01: TRANSMITTED AS "JANUARY"
            10: TRANSMITTED AS "OCTOBER"
            FF: VOICE CORRESPONDING TO MONTH IS NOT TRANSMITTED

| DF4 | DF5 | DF6 | DF7 |

→ MINUTE ex) 00: TRANSMITTED AS "O'CLOCK"
             10: TRANSMITTED AS "TEN"
             59: TRANSMITTED AS "FIFTY NINE"

→ HOUR ex) 00: TRANSMITTED AS "12 A.M."
           11: TRANSMITTED AS "11 A.M."
           14: TRANSMITTED AS "2 P.M."

*Fig. 10A*

2) MSG ID=1,4,5,6

| DF0 | DF1 | DF2 | DF3 |

↓
AREA CODE
 ex) FF02: TRANSMITTED AS "02"
     F032: TRANSMITTED AS "032"
     FFFF: NO VOICE TRANSMISSION (WHEN THE AREA CODE IS NOT REQUIRED)

| DF4 | DF5 | DF6 | DF7 |

↓
LOCAL EXCHANGE NUMBER
 ex) FFF2: TRANSMITTED AS "2"
     F546: TRANSMITTED AS "546"
     F6FF: TRANSMITTED AS "600"
     F9F8: TRANSMITTED AS "908"

| DF8 | DF9 | DF10 | DF11 |

↓
SUBSCRIBER NUMBER
 ex) 0002: TRANSMITTED AS "0002"
     0600: TRANSMITTED AS "0600"
     0546: TRANSMITTED AS "0546"

*Fig. 10B*

VOICE ANNOUNCEMENT TECHNIQUE OF AN ELECTRONIC EXCHANGE SYSTEM

CLAIM OF PRIORITY

This application claims all benefits accruing under 35 U.S.C. §119 from an application for AN ANNOUNCEMENT DEVICE AND METHOD OF AN ELECTRONIC EXCHANGE SYSTEM earlier filed in the Korean Industrial Property Office on Oct. 28, 1995 and there duly assigned Serial No. 37904/1995.

BACKGROUND OF THE INVENTION

Field of the Invention

The present invention relates to a voice announcement technique for an electronic exchange system, and more particularly, to a technique for supplying a voice announcement as needed by a subscriber.

Description of the Related Art

With recent improvements in communication, a digital electronic exchange system performs various communication services on different situations which may occur during a communication, besides a typical exchanging function. In an electronic exchange system however, the voice announcement function is provided to subscribers by using ready-made voice announcement messages. In order to provide various voice announcement services to the subscribers, it is necessary to provide variable voice announcements such as the time, date, number information, or other items of information, besides the ready-made voice announcement service.

Exemplars of recent efforts in the art include U.S. Pat. No. 5,483,578 to Ackermann et al., entitled *Method Of Managing A Speech Memory, And Assembly Therefor*, U.S. Pat. No. 5,367,609 to Hopper et al., entitled *Editing Compressed And Decompressed Voice Information Simultaneously*, U.S. Pat. No. 5,349,636 to Irribarren, entitled *Interface System And Method For Interconnecting A Voice Message System And An Interactive Voice Response System*, U.S. Pat. No. 5,222,124 to Castaneda et al., entitled *PBX System Communications Device*, U.S. Pat. No. 5,142,527 to Barbier et al., entitled *Voice Message Equipment For An Automatic Exchange*, U.S. Pat. No. 5,054,054 to Pessia et al., entitled *Voice Applications Generator*, U.S. Pat. No. 4,446,336 to Bethel et al., entitled *Method For Recording And Updating Stored Messages In An Announcement System*, and U.S. Pat. No. 4,221,933 to Cornell et al., entitled *Data Storage And Retrieval Structure For A Message Storage System*.

SUMMARY OF THE INVENTION

It is therefore, an object of the present invention to provide an improved electronic telecommunications exchange system.

It is another object to provide a voice announcement device for an electronic exchange system using one digital signal processor to simultaneously read and edit voice announcement messages for a plurality of channels from a voice memory without additional control processors and to transmit the edited voice announcement information in a PCM code, by transmitting and receiving word type control data from a main processor.

It is still another object to provide an electronic telecommunications exchange system able to use a single digital signal processor to transmit edited oral information by pulse code modulated signals.

It is yet another object to provide an electronic telecommunications exchange system providing voice announcement information by allotting control data for each channel to a plurality of regions in word units during data transmission and reception between a main processor and a digital signal processor and by forming a flag at an interrupt region to indicate whether or not corresponding data has been transmitted or received.

It is still another object to provide an edit type voice announcement device and process for an electronic exchange system, able to test the state of a voice announcement function by repeatedly transmitting a designated value for every frame to a channel required by a main processor and by then reading each frame and comparing the values read on a sub-highway.

To achieve these and other objects of the present invention, a voice announcement device for an electronic exchange system may be constructed with a main processor controlling a voice announcement function and a switch operated on the basis of time to switch a voice announcement message to a subscriber interface unit. A voice memory stores coded data corresponding to words and pauses; a processor interface unit connected to the main processor, serves as an interface for a voice announcement commands from the main processor; while a buffer unit is connected to the processor interface unit, to buffer information for performing a voice announcement with the main processor. A digital signal processing unit is connected to the buffer unit, and controls the voice memory to access corresponding words and pauses when the voice announcement command has been received. This reproduces a voice announcement message. An output stage, that is connected to the time switch via a sub highway, transmits the voice announcement message to the sub highway under the control of the digital signal processing unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 10A and 10B are diagrams each showing a data field map of the map of FIG. 9 in accordance with a message ID;

DETAILED DESCRIPTION OF THE PREFERRED EMBODIMENT

A preferred embodiment of the present invention will be fully discussed hereinbelow with reference to the accompanying drawings. It should be noted that the same parts or elements of the drawings are represented by the same number or symbol wherever possible.

Figure 1:
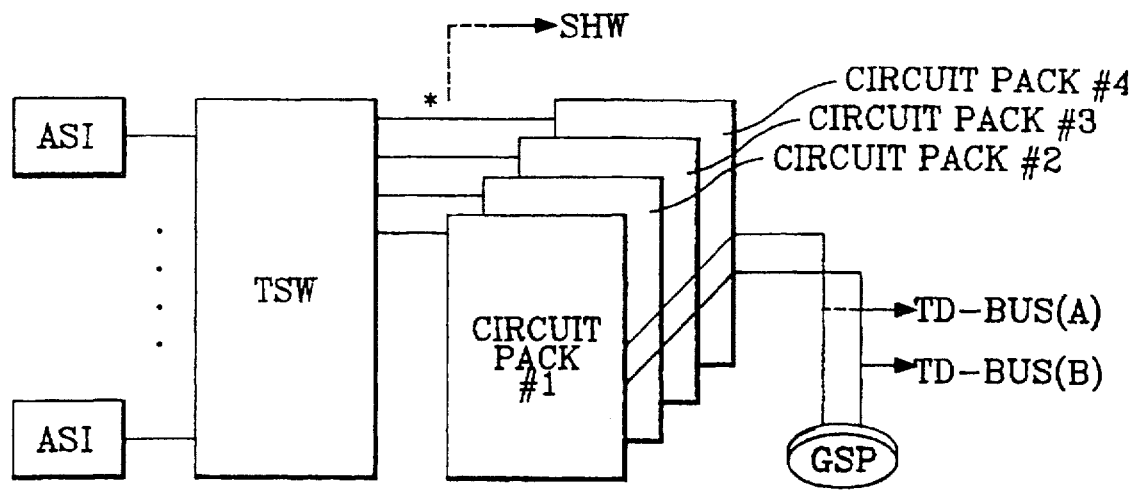
FIG. 1 is a diagram showing the relationship between a voice announcement device according to the present invention and an electronic exchange system.

FIG. 1 is a diagram showing the relationship between a voice announcement device according to the present invention and an electronic exchange system. The voice announcement device is composed of a plurality of circuit packs. The voice announcement device is connected to a duplexed main processor (hereinafter referred to as a "GSP" (Global Service Processor)) via control buses (hereinafter referred to as a "TD-BUS"). In addition, the voice announcement device is connected to a time switch (hereinafter referred to as a "TSW") via a sub highway (hereinafter referred to as an "SHW"). The TSW is connected to an analog subscriber interface unit (hereinafter referred to as an "ASI") for interfacing with each subscriber.

The voice announcement device of the electronic exchange system must be able to transmit to subscribers variable voice announcement information besides ready-made voice announcement service. An edit type voice announcement device performs such a voice announcement information servicing function. The voice announcement device according to the present invention edits several variable words combined with several basic fixed words in the order of a sentence under the control of the control processor, thereby forming one complete voice announcement sentence. Thereafter, the voice announcement device outputs such edited-voice announcement information in the form of PCM coded digital data. In order to make it possible, the voice announcement device stores in advance the PCM coded data corresponding to basic words and pauses required in servicing the voice announcement in a voice data bank composed of a plurality of nonvolatile memories (EEPROM, i.e., an electrically erasable programmable read only memory). If a command is transmitted from the main processor for controlling the voice announcement device, a digital signal processor (hereinafter referred to as a "DSP") in the voice announcement device analyzes the command and then makes a table for the sentence to be output. At this time, the proper length of pauses are inserted in accordance with the correlation between the time periods preceding and following each word so as to improve the clarity and recognizability of the voice announcement.

In the voice announcement device of the present invention, a single DSP processes the analysis of the command transmitted from the main processor and the transmission of the PCM data without an additional processor. In addition, one DSP can transmit identical or different voice announcement information in the form of PCM data which is used in an electronic exchange system without separate code changes by using 16 channels at a time at a maximum.

The voice announcement device is embodied in one circuit pack, and each circuit pack is connected to the time switch via 2.048Mbps of standard sub highway. Since a maximum of four cards of circuit packs can be disposed in each hardware module, the channel capacity is from 16 channels (at a minimum) to 64 channels (at a maximum) and the channel capacity can be easily varied in 16 channel increments as needed. In addition, since the voice announcement device operates in circuit pack units, if any trouble occurs in the device, defects can be limited to one circuit pack and the defective circuit pack can be easily placed out of service, and further it is possible to configure in a redundancy structure of N+1 circuit pack units.

There are six kinds of voice announcement messages which can be transmitted from the voice announcement device of the present invention, such as A Changed Number Announcement, An Absence of a Party Announcement, A Do Not Disturb Announcement, A Self Number Announcement, An Outgoing Call Number Announcement and An Incoming Call Selective Speech Announcement. However, if necessary, other kinds of voice announcement messages or messages in foreign languages are also possible.

Figure 2:
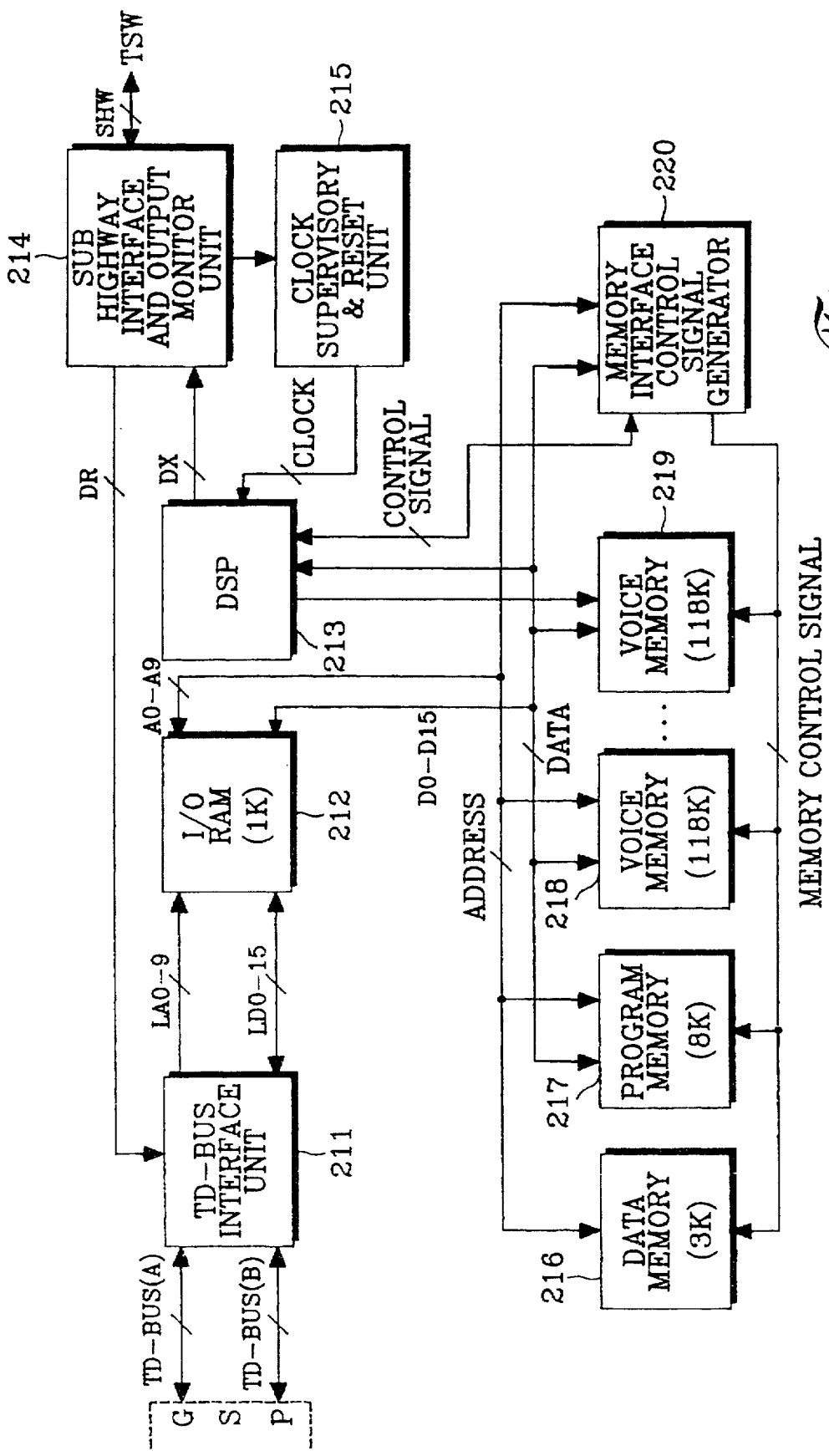
FIG. 2 is a block diagram showing an internal construction of the voice announcement device of the electronic exchange system according to the present invention.

FIG. 2 is a block diagram showing an internal construction of the voice announcement device. The TD-BUS interface unit 211 is connected to the GSP via the TD-BUS and performs an information interface between the GSP and the voice announcement device. A DSP 213 controls the overall operations of the voice announcement device, and processes and reproduces the voice announcement information as a voice announcement message. An I/O RAM 212 is connected between the TD-BUS interface unit 211 and internal buses and serves to buffer the information interfaced between the GSP and the DSP 213. A sub highway interface and output monitor unit 214 is connected to the TSW via the SHW and performs the voice information interface between the voice announcement device and the TSW and the output monitor function. A clock supervisory and reset unit 215 supervises a clock output from the sub highway interface and output monitor unit 214 and supplies the clock to the DSP 213. A data memory 216, such as an SRAM, i.e., a static random access memory, temporarily stores the data generated while performing the voice announcement function. A program memory 217, such as a PROM, i.e., a programmable read only memory, stores a program for performing the voice announcement function of the voice announcement device. Voice memories 218–219 store various voice data used for the voice announcement. A memory interface control signal generator 220 generates a memory control signal for controlling the operations of the memories 216–219 under the control of the DSP 213.

In the voice announcement device having the structure as described above, the TD-BUS interface unit 211 performs a transmission/reception interface of a TD-BUS signal. The TD-BUS signal has 16 bits of addresses, 16 bits of data, 4 bits of modes for determining the type of operation and other signals.

The TD-BUS interface unit 211 selects one valid bus of the duplexed buses in response to a TB-SEL signal and performs a read/write operation from/to the I/O RAM 212 for transmitting/receiving control information to/from the DSP 213 by using the mode decode and address and data information.

The I/O RAM 212 has the data format of address to word by using two dual port static RAMs of 1Kbit×8bit, and is used as a data transmission/reception buffer for a data transmission between the TD-BUS interface unit 211 and the DSP 213. The GSP can read/write two bytes of data from/to the I/O RAM 212 via the TD-BUS every access cycle.

The left port of the I/O RAM 212 is connected to the TD-BUS interface unit 211, addresses LA0–LA9, data LD0–LD15, a chip enable signal LCE, an output enable signal LOE and a write enable signal LWE, and the right port thereof is connected to various signals such as RA0–RA9, RD0–RD15, RCE, ROE, RWE, INT used for reading or writing data in the I/O RAM 212.

Figure 3:
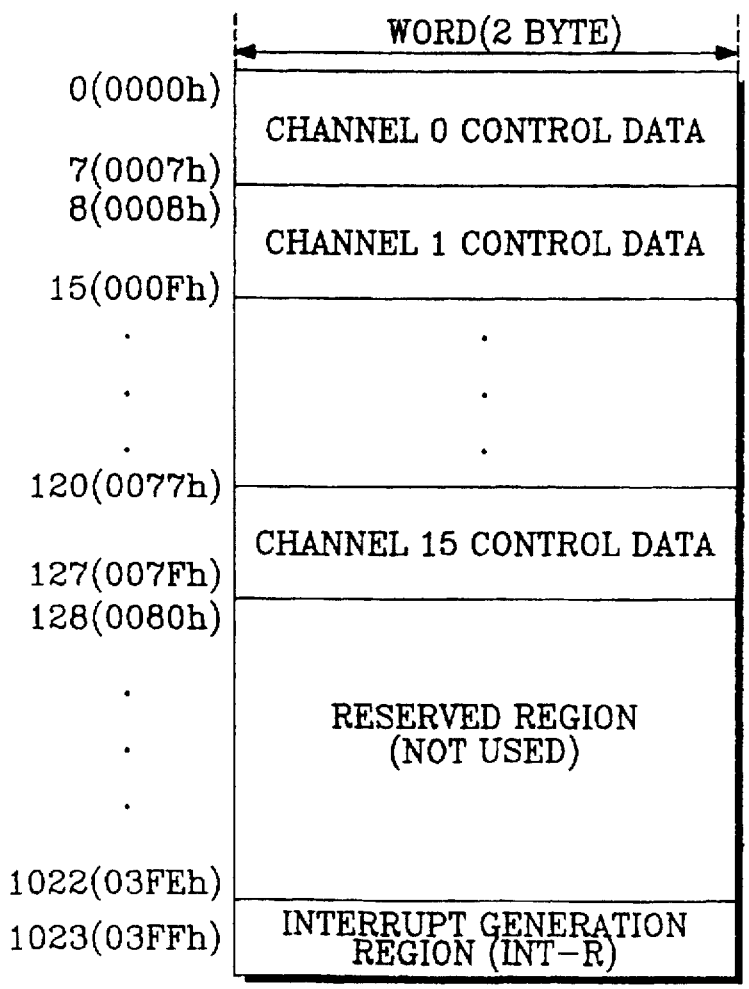
FIG. 3 is a diagram showing an address map of an I/O RAM in the voice announcement device of FIG. 2.
Figure 9:
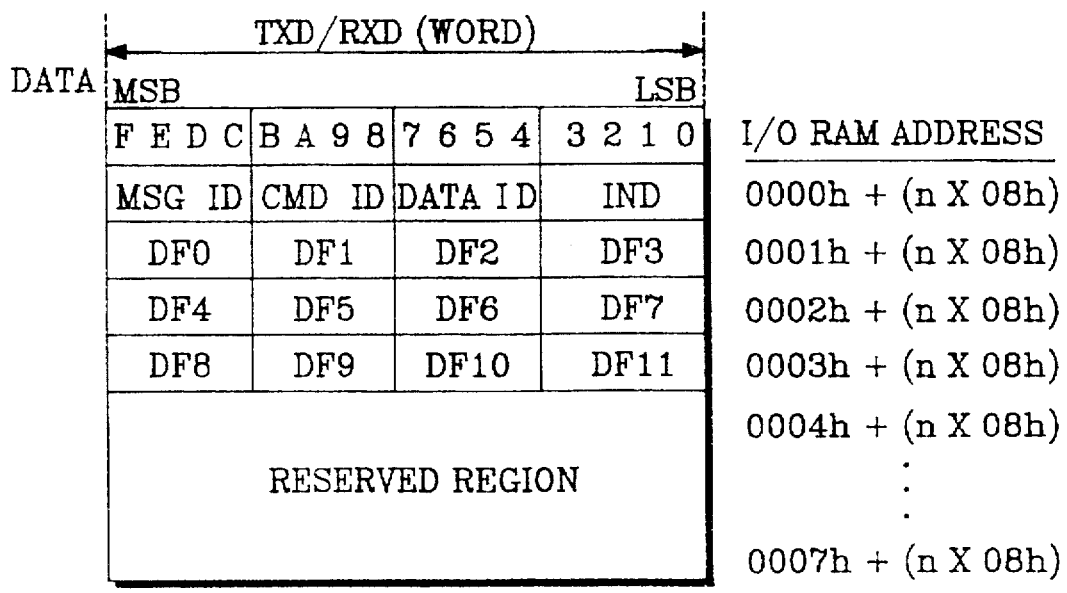
FIG. 9 is a diagram showing a channel control data map of the address map of FIG. 3.

FIG. 3 shows an address map of the I/O RAM 212. The DSP 213 transmits the PCM data of 16 channels at a time. In FIG. 3, the addresses 0–127 are control data transmission/ reception regions, 8 words being allotted to each channel. An address 1023 is an interrupt generation region for informing the DSP 213 of the interrupt INT after the GSP writes the control data in the memory region of the corresponding channel. If the GSP writes the data in these addresses as shown in FIG. 9 (which will be discussed hereinbelow), an interrupt signal goes to a logic "low" level by a characteristic of the I/O RAM 212 and is supplied to an interrupt terminal of the DSP 213, thereby making the DSP 213 perform a new operation. The addresses 128–1022 are reserved regions.

In order to transmit the voice data every frame by using 16 channels at a time, the DSP 213 analyzes the control data of each channel read-out from the I/O RAM 212, reads the required word data from the voice data bank designated by a generated table in the form of the word once every two frames, inserts it into the designated time slot of the sub highway connected to the serial port of the DSP 213 and then transmits it in the form of serial data of 2.048Mbps.

Figure 4:
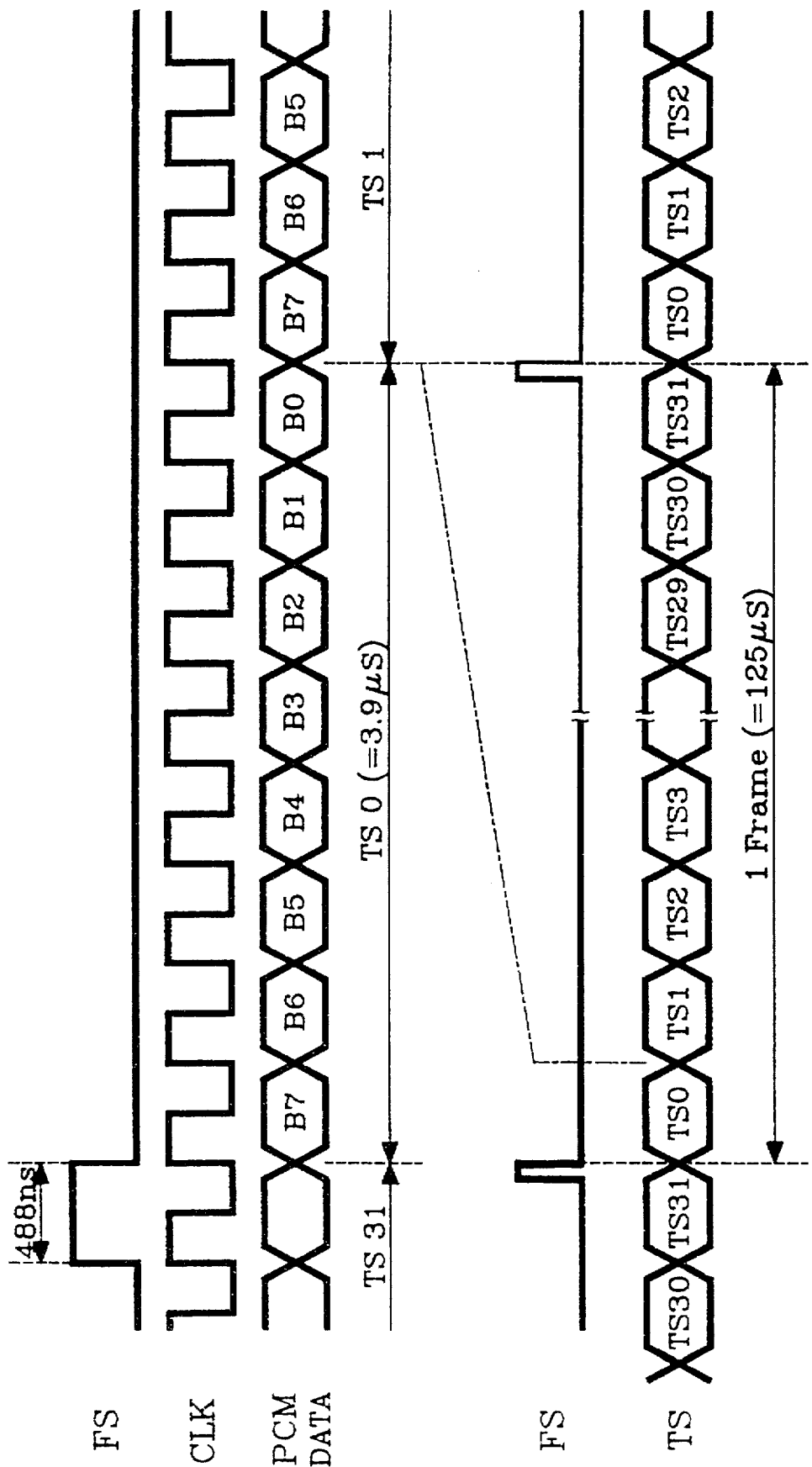
FIG. 4 is a waveform diagram showing operational characteristics of a frame synchronization signal, a system clock, data, and time slot.

FIG. 4 is a timing diagram of 8KHz of frame sync clock FS, 2.048 MHz of system clock CLK, PCM data and the time slot TS.

The DSP 213 (TI320C25 is used in the present invention) uses the output of a 40 MHz oscillator in the circuit pack as its basic clock and uses 8KHz of frame sync clock FS and 2.048 MHz of system clock CLK received from the time switch TSW block as clocks for the transmission sync clock of the serial port.

The memory interface control signal generator 220 generates various memory control signals for controlling the operations of the I/O RAM 212 for a transmission/reception of the control signal with the GSP, the program memory 217 for storing the program, the data memory 216 for processing data and the voice memories 218–219 for storing the voice data. Since the voice memories 218–219 and I/O RAM 212 have DSP access time (speed) in the range of from 35 ns to 120 ns, if the DSP 213 accesses these memories 216–219, one wait signal is automatically generated from the DSP 213.

Figure 7:
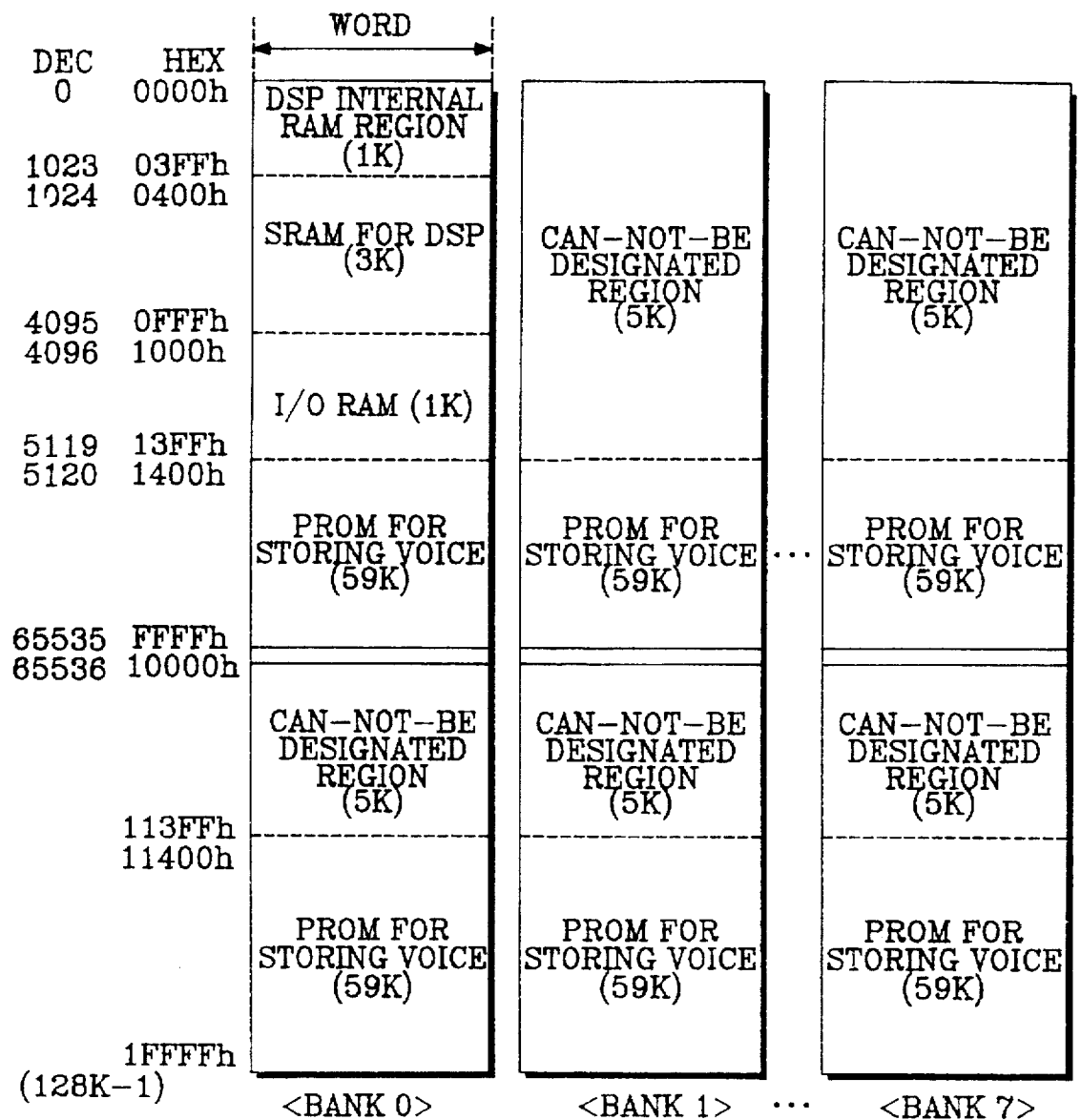
FIG. 7 is a diagram showing a memory address map of the digital signal processor shown in FIG. 2.

FIG. 7 shows a memory map of the DSP 213. The direct access region of the data memory 216 is 64kwords at a maximum; however, the voice announcement device of the present invention generates the address A16 of the voice memories 218–219 and a selection signal of the memories by using the I/O port access of the DSP 213, thus extending the range of the addresses that the DSP 213 can access, up to 128Kwords.

The region of the voice memories 218–219 is divided into 8 memory banks. The maximum memory region has the structure of 118Kword/Bank×8 Banks and the voice memories can be disposed in the circuit pack in one bank increments (comprised of two 128Kbyte memories) in accordance with the required capacity. In this case, 8 banks at a maximum can be disposed in one circuit pack.

Figure 6:
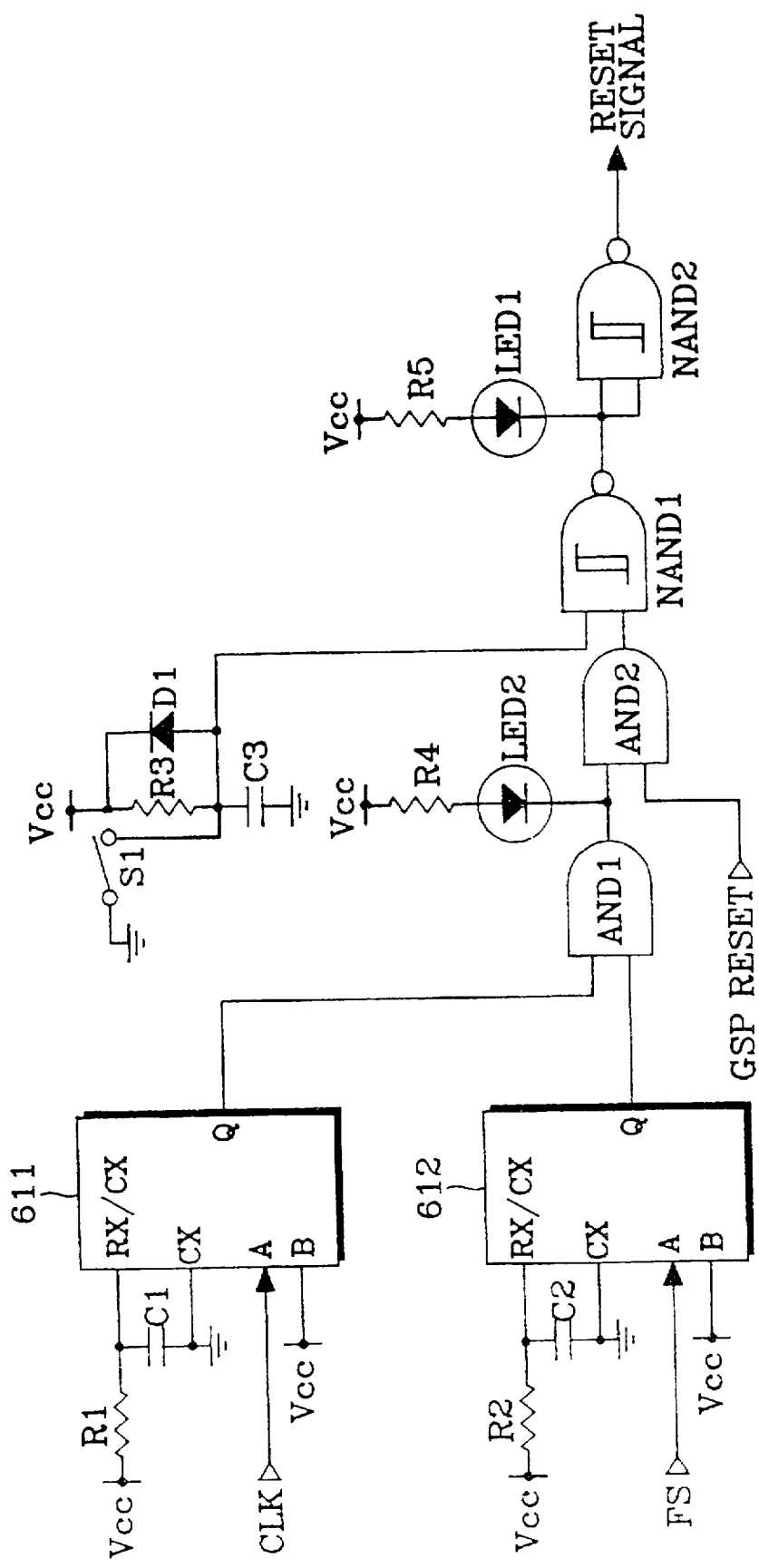
FIG. 6 is a diagram showing the clock supervisory and reset unit shown in FIG. 2.

FIG. 6 is a detailed diagram showing the construction of the clock supervisory and reset unit 215 of FIG. 2.

In FIG. 6, pulse generators 611 and 612 supervise whether or not the input states of the frame sync clock FS and system clock CLK are normal. If the frame sync clock FS and system clock CLK are not input for a predetermined time period, the clock supervisory and reset unit 215 automatically reset the DSP 213. If the frame sync clock FS and system clock CLK are normally input, the clock supervisory and reset unit 215 allows the DSP 213 to operate and upon the power being turned on, enables an initial reset of the DSP 213. An LED1 is a light emitting diode displaying a reset state, and an LED2 displays whether or not the input clock is normal. The circuit of FIG. 6 is constructed such that it is possible to reset the DSP 213 by a request from the GSP and to manually reset the DSP 213 by a switch S1 in the front part of the circuit pack.

The sub highway is output from the DSP 213 to the time switch TSW via the sub highway interface unit 214-1. The sub highway interface unit 214-1 directly returns the test data loaded on the time slot TS to the TS-BUS interface unit 211. The sub highway interface and output monitor unit 214 is divided into the sub highway interface unit 214-1 and the output monitor unit 214-2.

Figure 5:
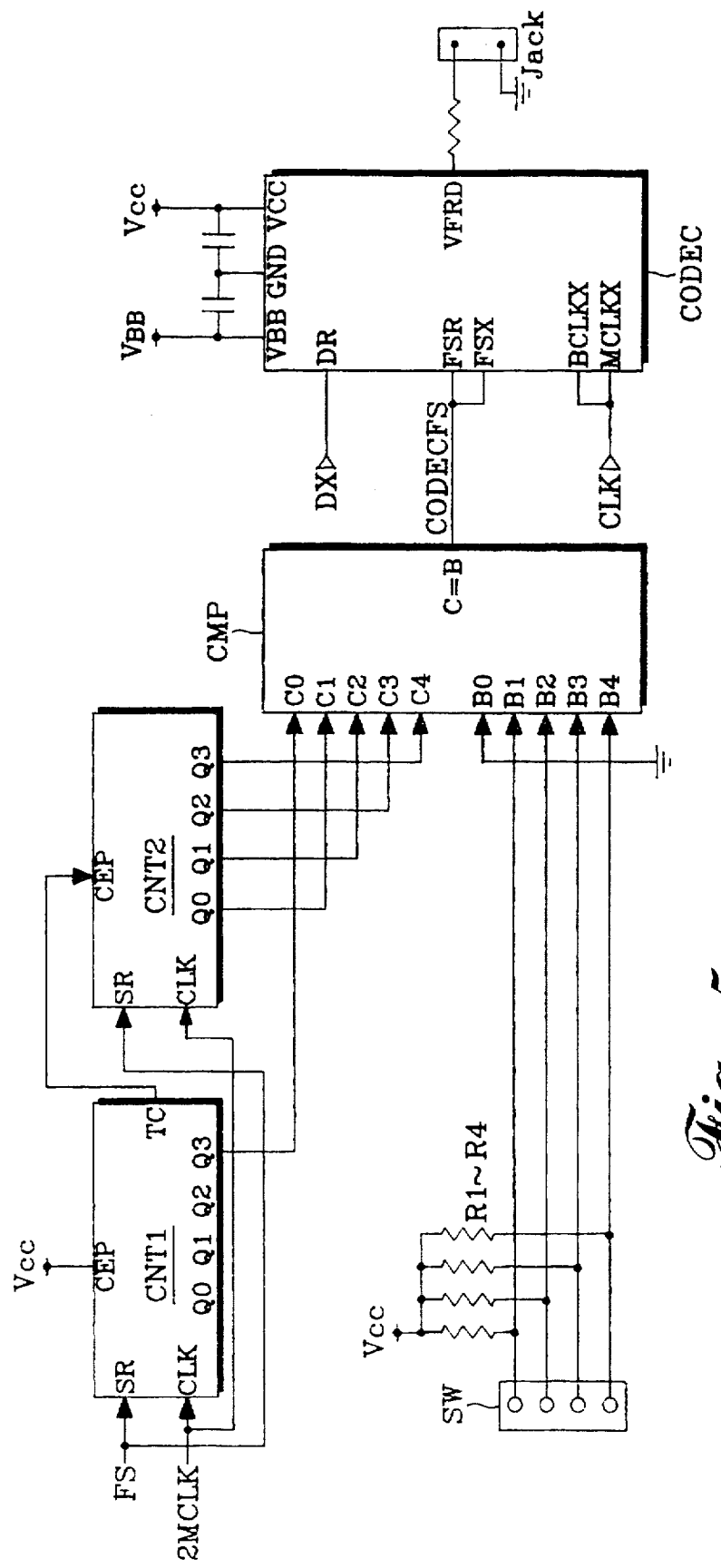
FIG. 5 is a diagram showing the output monitor unit shown in FIG. 2.

FIG. 5 is a diagram showing a detailed construction of the output monitor unit 214-2.

The user can determine whether or not the message edited by the request from the GSP is correctly transmitted, by connecting a telephone handset attached to the circuit pack to a telephone handset jack after selecting the TS number by operating a binary rotary switch SW attached to the front part of the circuit pack. A comparator CMP inputs signals B0–B4 for selecting the TS number and outputs a signal CODECFS which maintains a logic "high" level only for one TS period corresponding to 3.9 ns if the signals B0–B4 correspond to frequency-dividing signals C0–C4 output from frequency dividers CNT1–CNT2, and stays at a logic "low" level during the remaining periods. In this case, the signal CODECFS has a repetition rate of 8KHz. The signal CODECFS is supplied to a PCM code/decode chip CODEC and the voice to be transmitted to a preset TS can be easily monitored via the handset connected to the jack. When any of 16 channels is being used to output the voice by the DSP 213 or to perform a self-testing, a green light emitting diode LED for displaying the state, and attached to the front part of the circuit pack, is turned on, thereby making it easy for a system operator to identify the circuit pack that is processing the service.

In order to control the voice announcement, the GSP should transmit or read the control data to or from the corresponding channel region of the I/O RAM 212 via the TD-BUS. The TD-BUS is composed of 4 bit modes for designating the kinds of the operations such as read, write, etc., 16 bit addresses, 16 bit TX data, 16 bit RX data and transmission sync clocks SCLX, FS, RDY.

In the memory map of FIG. 3, the memory region allotted to each channel is composed of 8 words. If data is written into the channel 0 and thereafter the channel value is written into an INT-R address, the DSP 213 receives the control data and then transmits the PCM data to the TS1 on the SHW. That is, the PCM data is loaded to add time slots TS on the SHW like CH0 -->TS1, CH1 -->TS3, CH2 -->TS5 . . . -->TS31.

Figure 8:
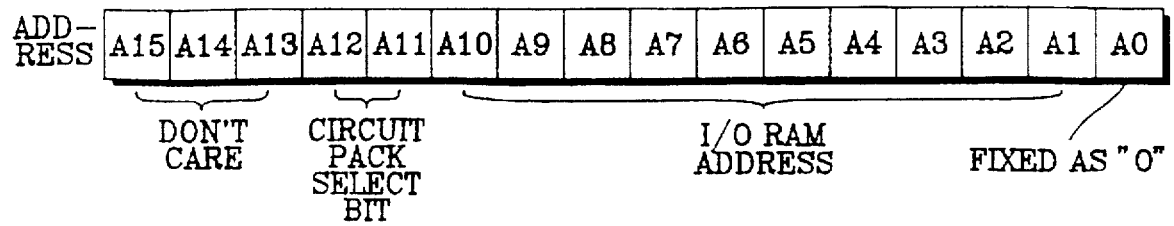
FIG. 8 is a diagram showing an address map on a TD BUS.

FIG. 8 shows a format of an address transmitted to the TD-BUS. The addresses A1–A10 are I/O RAM addresses and the addresses A11 and A12 are used as selection bits for 4 circuit packs.

FIG. 9 shows a map of the control data region of each channel of FIG. 3. The first address of each corresponding channel is a control field and the remaining addresses are used as a data field.

The MSG ID of the control field, composed of 4 bits, is the information transmitted from the GSP and is used for designating the kind of the service to be performed. The services corresponding to the values of the MSG ID are as follows:

0: Test Data Transmission Request
1: Changed Number Announcement
2: Absence of a Party Announcement
3: Do Not Disturb Announcement
4: Self Number Announcement
5: Originating Call Subscriber Number Announcement
6: Terminating Call Selective Speech Announcement
7 - F(h): Reserved Region.

The CMD ID of the control field is the information transmitted from the GSP and is used as the service request associated connection/release command information of the designated channel. The commands corresponding to the values of the CMD ID are as follows:

0: connection (start) request
1: release (stop) request
2 - F(h): reserved region.

The DATA ID of the control field refers to the number of words of the required data field DFx (x=1–11) of the designated service, and has various values according to the kind of messages to be edited as follows:

1: It is used when the MSG ID is 0, i.e., it is used when test data is generated.
2: It is used when the MSG ID is 2, 3, i.e., it is used for the time information announcement.
3: It is used when the MSG ID is 1, 4, 5, 6, i.e., it is used for the number information announcement.
F: It indicates to that there is no corresponding value in the data field. In this case, if the MSG ID is 5 or 6, a message that a corresponding number cannot be confirmed is transmitted.

The IND of the control field is used to display whether or not each channel is being used. The commands corresponding to the values of the IND are as follows:

O: It is an initial value which is set when the GSP requests other service and it indicates that the corresponding channel is being used.
F: It is the value for informing the GSP that the corresponding channel has completed its service and is in an idle state. The GSP periodically checks the IND state of each channel, thereby checking whether or not the corresponding channel is being used, i.e. whether the corresponding channel is in an idle state or in a busy state.

Returning to FIG. 9, seven words at a maximum are allotted to the data field; only 8 words are used for the above six services and the remaining words are used as reserved regions.

If the MSG ID is 0, the data fields DF0–DF1 refer to the test pattern which should be repeatedly transmitted by the DSP 213 to corresponding time slot TS every frame. That is, the GSP designates one time slot TS and makes the DSP 213 transmit the test pattern to the designated time slot TS so as to test the operation state of the DSP 213. Thus, the GSP determines whether or not the DSP 213 operates normally by reading to compare 8 bits of values loaded on the SHW.

If the MSG ID is 2 or 3, the data fields DF0–DF7 refer to the information on Month/Date/Hour/Minute. If only the information on the Hour/Minute is required, the DFs allotted to the Month/Date are filled with "Fs".

Referring to FIG. 10A, the DF0–DF1 are the regions allotted to the information on month, the DF2–DF3 are the regions allotted to the information on date, the DF4–DF5 are the regions allotted to the information on hours and the DF6–DF7 are the regions allotted to the information on minutes.

If the MSG ID is 1, 4, 5, 6, the information on the number corresponds to the data fields as shown in FIG. 10B. The DF0–DF3 are the regions allotted to the area code, the DF4–DF7 are the regions allotted to the local exchange number, and the DF8–DF11 are the regions allotted to the subscriber number. In this case, if there are no corresponding numbers, the corresponding region is filled with "Fs".

Figure 11:
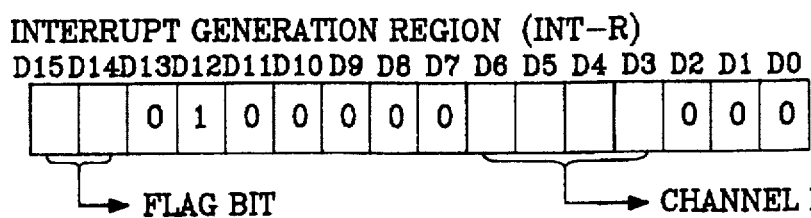
FIG. 11 is a diagram showing a map of an interrupt generation region of the map shown in FIG. 3.

In the address map shown in FIG. 3, if the GSP writes an interrupt to the address 1023(03FFh) of the I/O RAM 212 as shown in FIG. 11, an interrupt signal is transmitted to the DSP 213. Then, the DSP 213 immediately reads the address 1023, translates the control data information on the channel and then processes the corresponding service routine.

Referring to FIG. 11, the DSP 213 reads the contents of the I/O RAM 212 by using the values of the D0–D13 as addresses. The D14 and D15 are flag bits and when the GSP transmits data, the flag bits are set to "00". The DSP 213 reads the values of the channel designated at the D0–D13, checks whether or not the command can be normally performed. If the command can be normally performed, the flag bits are set to "11", while if the command can not be normally performed, the flag bits are set to "10". This is for checking for a command error from the GSP or if an error occurred during the transmission. If there is no change in the flag bit after the passage of a predetermined period of time (more than 1 ms) after setting the flag bits to "00", this corresponds to the no-response state of the DSP 213. If the result is the same even after retrying another channel, this means that there is trouble in the voice announcement device due to the abnormal state of the DSP 213. In this case, the GSP informs the maintenance block that there is a problem in the voice announcement device and at the same time takes the device out of service and periodically performs a self test to check if the device operation has become normal.

At the initialization, the DSP 213 writes an "F" at the IND of each channel and sets the flag bit to "11". In addition, the DSP 213 turns off the LED displaying "in-service" and then stands-by for the generation of the interrupt.

Figure 12A:
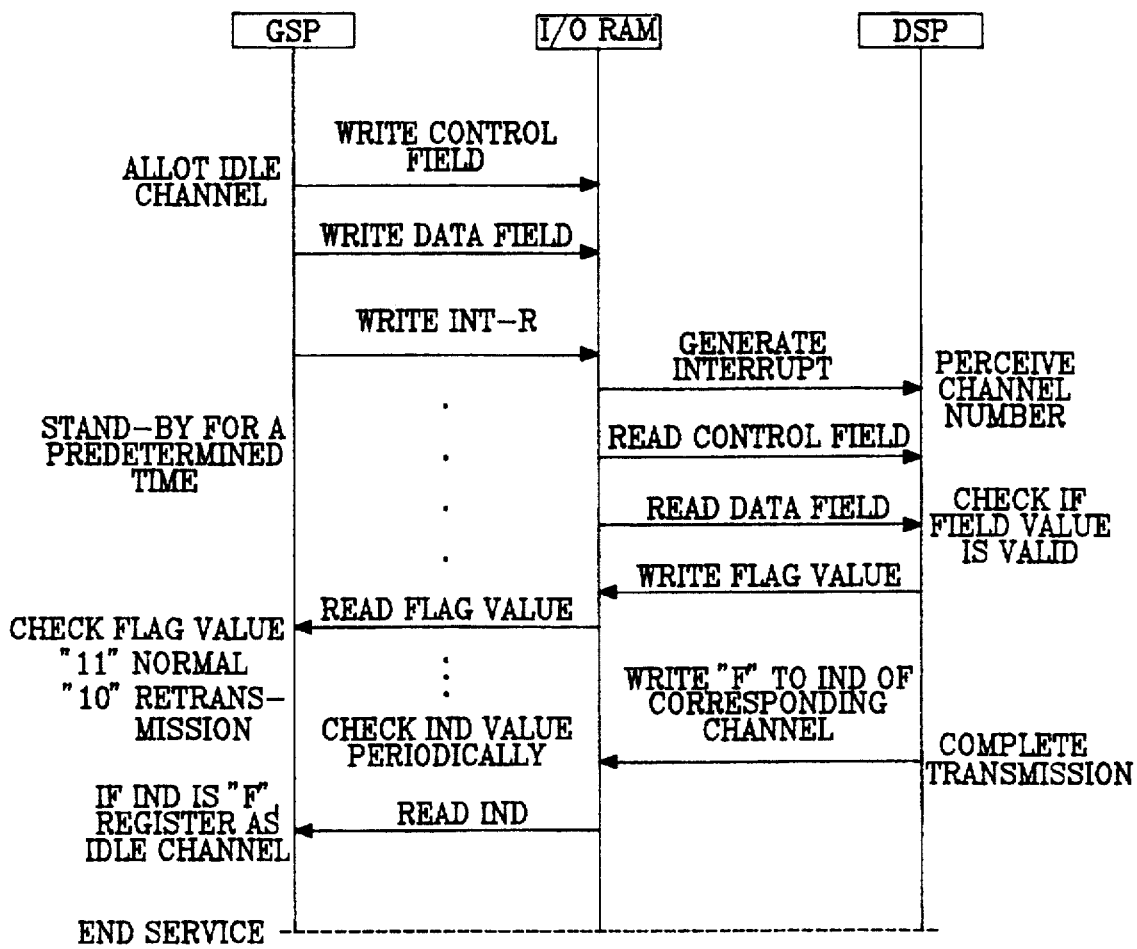
FIGS. 12A to 12C are diagrams each showing the procedure of performing the voice announcement function by the main processor.
Figure 12B:
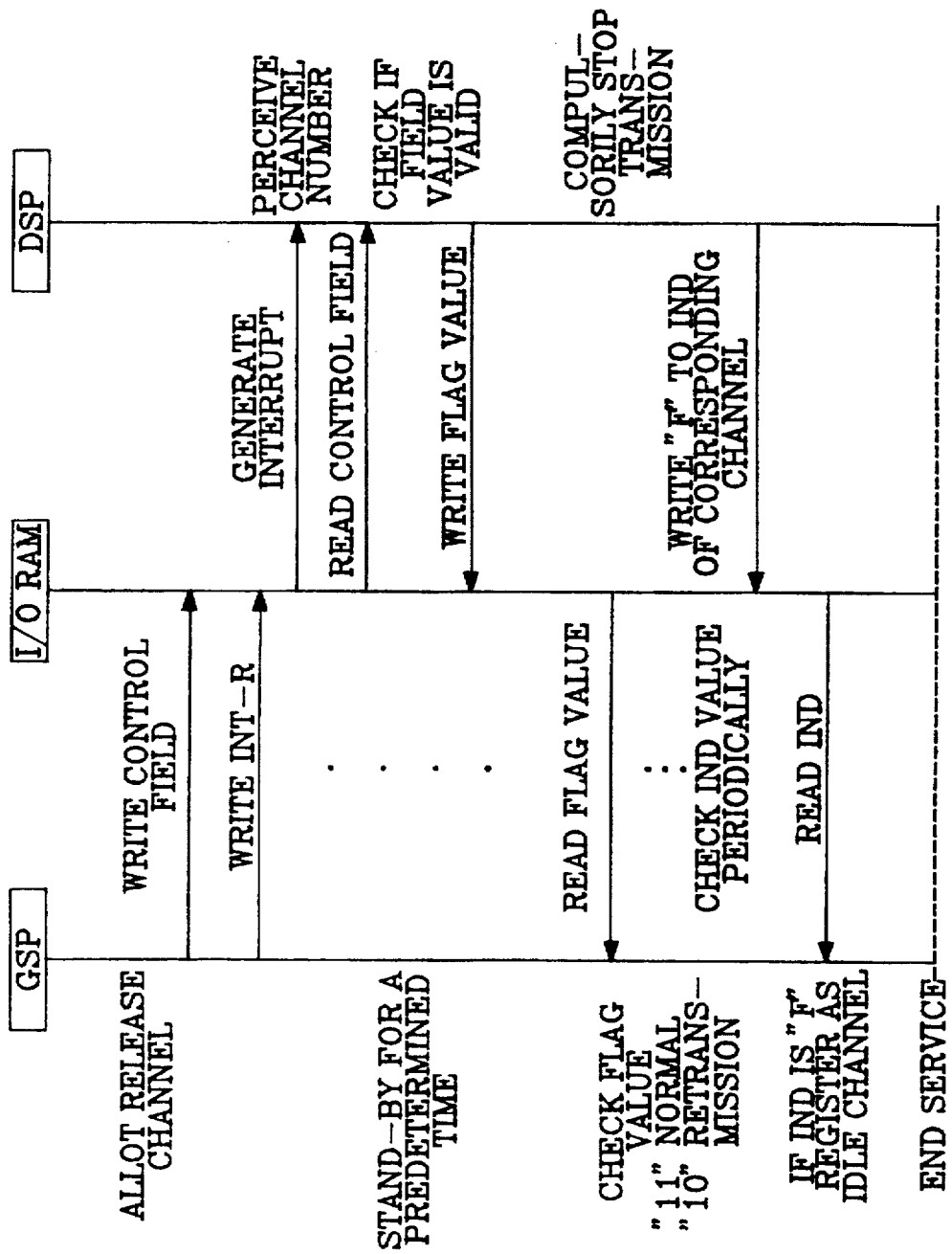
Figure 12C:
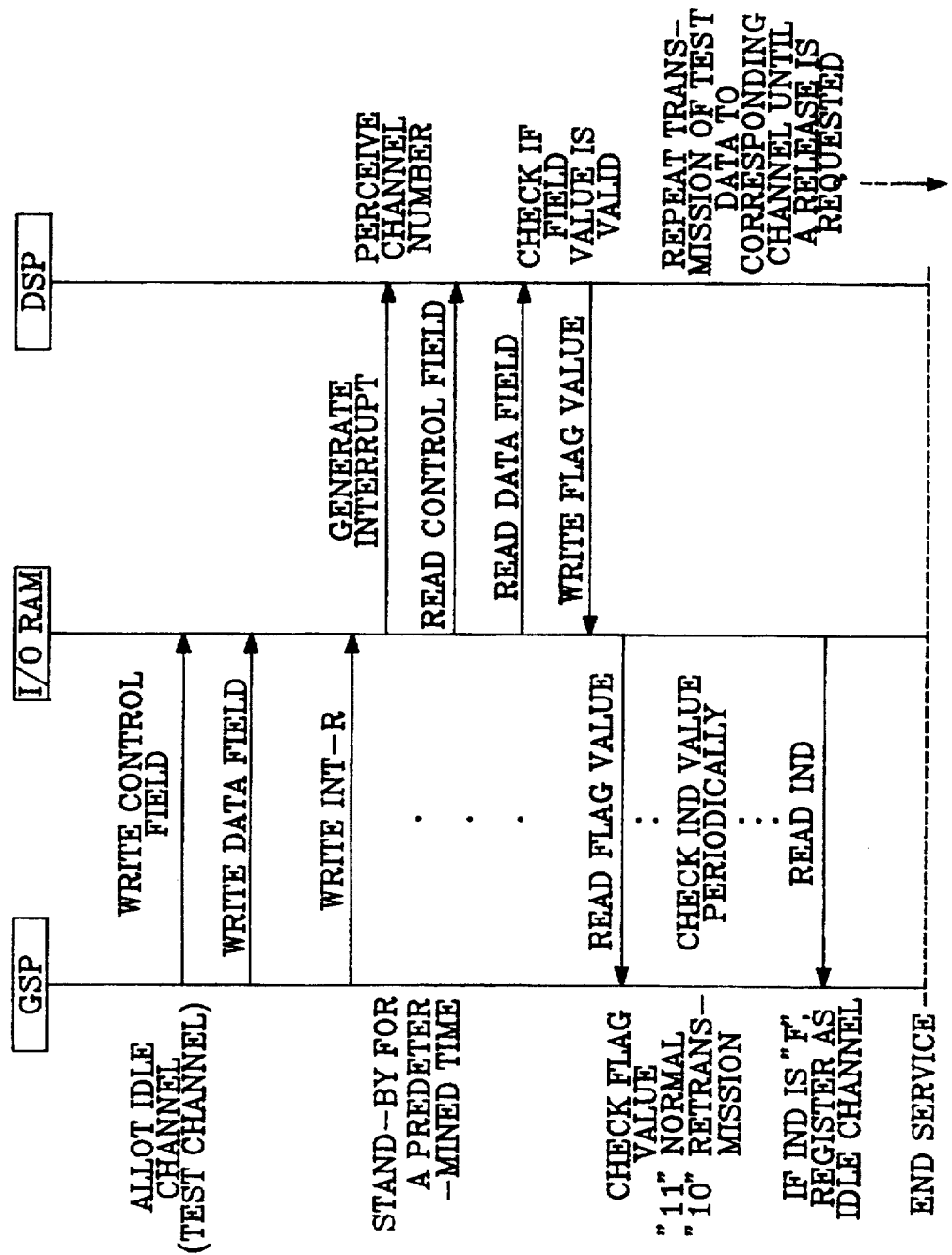

FIGS. 12A to 12C each shows the signal processing flow between the DSP 213 and the GSP.

FIG. 12A shows the process of requesting the transmission of the voice announcement message.

The GSP allots an idle channel, writes the information of the control field, data field and INT-R to the TD-BUS, and then stands-by for a predetermined period of time until a response is received. The TD-BUS interface unit 211 receives the information from the GSP via the TD-BUS and supplies it to the I/O RAM 212, and then the I/O RAM 212 stores the information. Thereafter, the I/O RAM 212 transmits an interrupt to the DSP 213 showing that a request for transmitting the voice announcement message has been generated by the GSP. At this time, the DSP 213 determines the channel number.

Thereafter, the I/O RAM 212 outputs the stored information of the control field and data field to the DSP 213. Then, the DSP 213 analyzes the information of the control field and data field, checks whether or not the field value is valid and then outputs a response flag to the I/O RAM 212. Then, the I/O RAM 212 outputs the response flag to the TD-BUS.

The GSP analyzes the value of the response flag and checks whether the information has been normally transmitted from the GSP (e.g. flag value="11") or abnormally transmitted (e.g. flag value="10"). If it is determined that the information has been abnormally transmitted, the GSP again requests the transmission of the voice announcement message. The GSP periodically checks the value of the IND, thus checking whether or not the channel is being used. In the case of an idle channel, the GSP completes the voice announcement service.

If the DSP 213 receives normal information of the control field and data field, it controls the memory interface control signal generator 220 to read the voice information from corresponding voice memories 218–219 and then processes the voice information into a voice, outputting it to the SHW. Thus, the voice announcement message is output to the TSW, thereby being reproduced for the subscriber. After completion of the transmission of the voice announcement message, the DSP 213 writes an "F" at a corresponding service channel and then transmits it, thereby informing the GSP that the transmission of the voice announcement message has been completed.

FIG. 12B shows the process of requesting the release of the voice announcement operation.

The GSP allots the channel for releasing the voice announcement that is presently being serviced, and outputs the information of the control field and INT-R to the TD-BUS and then stands-by for a predetermined period of time until a response is received. The TD-BUS interface unit 211 receives the information output from the GSP via the TD-BUS and supplies it to the I/O RAM 212, and then the I/O RAM 212 stores the information. Thereafter, the I/O RAM 212 outputs an interrupt to the DSP 213 indicating that a request for releasing the voice announcement message has been generated by the GSP. At this time, the DSP 213 determines the channel number. Thereafter, the I/O RAM 212 outputs the stored information of the control field to the DSP 213.

Then, the DSP 213 analyzes the information of the control field, checks whether or not the field value is valid and then outputs a response flag to the I/O RAM 212. The I/O RAM 212 outputs the response flag to the TD-BUS. The GSP analyzes the value of the response flag and determines whether or not the information has been normally transmitted from the GSP. If it is checked that the information has been abnormally transmitted, the GSP again requests the transmission of the voice announcement message.

If the value of the received control field is normal, the DSP 213 compulsorily stops the voice announcement service that is presently being transmitted, and writes an "F" at the IND of the corresponding channel. The GSP periodically checks the value of the IND, thereby checking whether or not the channel is being used. If the value of the corresponding channel is "F", the GSP completes the voice announcement service operation.

FIG. 12C shows the process of requesting the transmission of the test data. The GSP allots the idle channel as the test channel, supplies the information of the control field, data field and INT-R to the TD-BUS and then stands-by for a predetermined period of time until a response is received.

The TD-BUS interface unit 211 receives the information of the control field, data field and INT-R via the TD-BUS and supplies it to the I/O RAM 212, and then the I/O RAM 212 stores the information. Thereafter, the I/O RAM 212 generates an interrupt showing that a request for transmitting the voice announcement message has been generated by the GSP. At this time, the DSP 213 determines the channel number. The I/O RAM 212 outputs the stored information of the control field and data field to the DSP 213.

The DSP 213 analyzes the information of the control field and data field, checks whether or not the value of the fields is valid and outputs a response flag to the I/O RAM 212. The I/O RAM 212 outputs the response flag to the TD-BUS. The GSP analyzes the value of the response flag and checks whether or not the information has been normally transmitted from the GSP. If it is determined that the information has been transmitted abnormally, the GSP again requests in the transmission of the voice announcement message.

If the DSP 213 receives the normal information of the control field and data field, the DSP 213 transmits the test data to corresponding channel. In this case, the voice announcement message is output to the TSW and thus is reproduced for the subscriber. The transmission of the test data to the corresponding channel continues until a request for releasing the voice announcement operation is generated.

Figure 13:
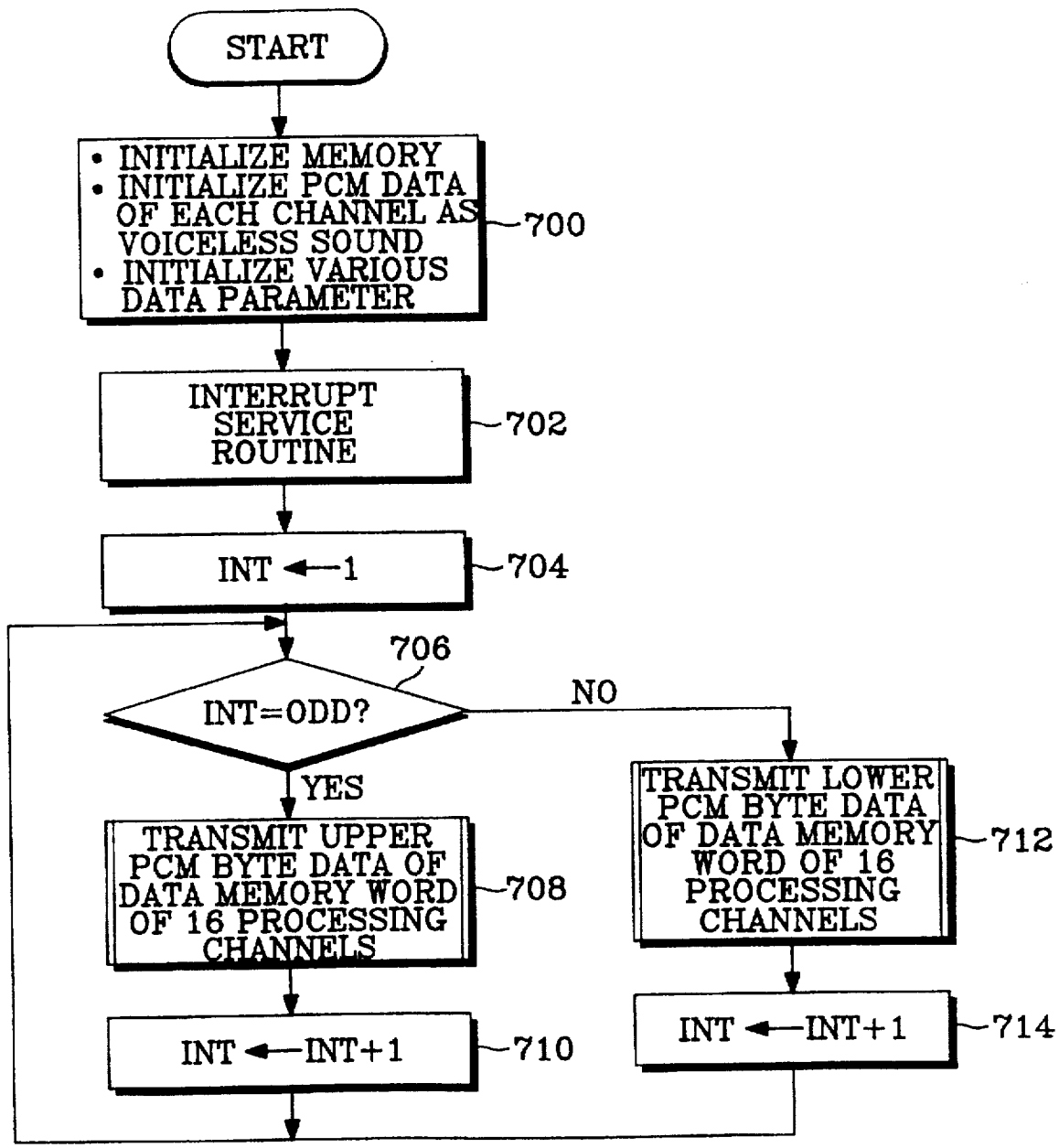
FIG. 13 is a flowchart showing the procedure for transmitting the voice in time slot.

FIG. 13 shows the process of voice transmission (for example, the test data transmission) per time slot. At step 700, the DSP 213 initializes external and internal memories and various data parameters and initializes the PCM data of each channel as voiceless sound. At step 702, the DSP 213 enters an interrupt service routine. At step 704, the DSP 213 sets the frequency of the interrupt counter INT to 1, and at step 706, the DSP 213 checks whether the INT is odd or even. If it is determined that the INT is odd, then the DSP 213 goes to step 708 and transmits upper PCM byte data of the data memory word of 16 processing channels. If it is determined at step 706 that the INT is even, then the DSP 213 goes to step 712 and transmits lower PCM byte data of the data memory word of 16 processing channels.

Figure 14:
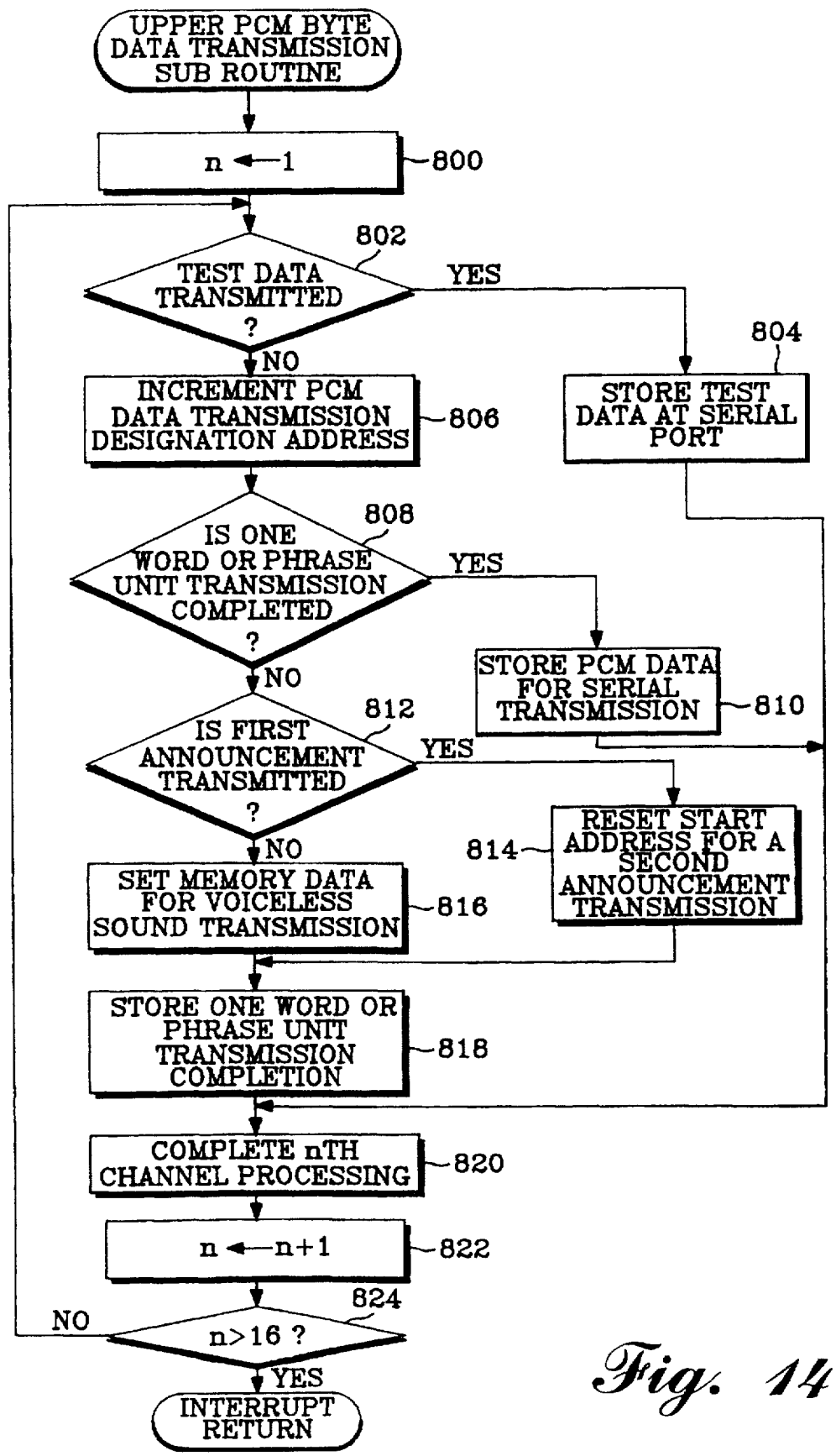
FIG. 14 is a flowchart showing a sub-routine for the step of transmitting upper PCM byte data of FIG. 13.

FIG. 14 shows a detailed flowchart corresponding to step 708. In step 800, the DSP 213 sets the channel parameter n to 1 and goes to step 802 to check if the test data has been transmitted. If it is determined that the test data has been transmitted, the DSP 213 goes to step 804 to store the test data at the serial port and then goes to step 820. If it is determined that the test data has not been transmitted, the DSP 213 increments the PCM data transmission designation address, outputting the test data at step 806. At step 808, the DSP 213 checks if one word or phrase unit transmission has been completed. If it is determined that one word or phrase unit transmission has been completed, the DSP 213 stores the PCM data at the serial port at step 810 and then goes to step 820.

If it is determined that one word or phrase unit transmission has not been completed, the DSP 213 goes to step 812 to determined if a first announcement has been transmitted. If it is determined that the first announcement has been transmitted, the DSP 213 goes to step 814 to reset the start address for a second announcement transmission and then goes to step 818. If it is determined that the first announcement has not been transmitted, the DSP 213 goes to step 816 to set the memory data for a voiceless sound transmission. At step 818, the DSP 213 stores one word or phrase unit transmission completion. At step 820, the DSP 213 completes the nth (n=1) channel processing and goes to step 822 to increment the channel parameter n by 1. At step 824, the DSP 213 checks if the channel parameter n is greater than 16. If the channel parameter n is smaller than 16, the DSP 213 returns to step 802. If the channel parameter n is greater than 16, the DSP 213 returns to step 710.

In accordance with the subroutine as described above, the upper PCM byte data of the data memory word of 16 processing channels is transmitted.

Thereafter, the DSP 213 goes to step 710 to increment the interrupt counter value INT by 1 and then returns to step 706.

Figure 15:
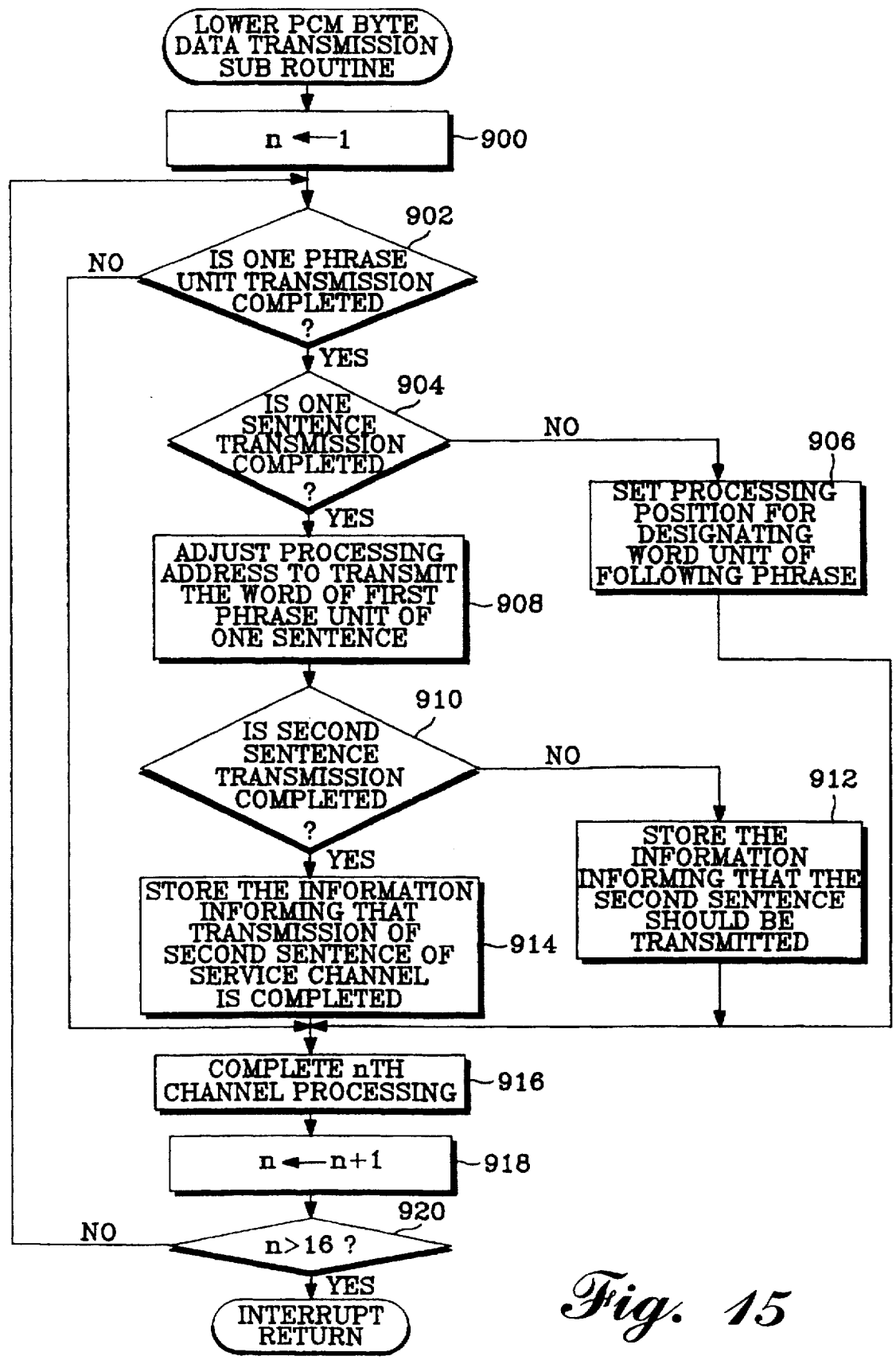
FIG. 15 is a flowchart showing a sub-routine for the step of transmitting lower PCM byte data of FIG. 13.

FIG. 15 shows a detailed flowchart corresponding to step 712 of FIG. 13. At step 900, the DSP 213 sets the channel parameter n to 1 and goes to step 902 to check if one phrase unit transmission has been completed. If it has not been completed, the DSP 213 goes to step 916. However, if one phrase unit transmission has been completed, the DSP 213 goes to step 904 to check if one sentence transmission has been completed. If it is determined that one sentence transmission has not been completed, the DSP 213 goes to step 906 to set the processing position which designates the word unit of the following phrase and then goes to step 916. However, if it is determined that one sentence transmission has been completed, the DSP 213 adjusts the processing address to transmit the word of the first phrase unit of one sentence at step 908.

At step 910, the DSP 213 checks if a second sentence transmission has been completed. If the second sentence transmission has not been completed, the DSP 213 goes to step 912 to store the information indicating that the second sentence should be transmitted and then goes to step 916. However, if the second sentence transmission has been completed, the DSP 213 goes to step 914 to store the information indicating that the transmission of the second sentence of the service channel has been completed.

At step 916, the DSP 213 completes the nth (n=1) channel processing and goes to step 918 to increment the channel parameter n by 1. At step 920, the DSP 213 checks if the channel parameter n is greater than 16. If the channel parameter n is smaller than 16, the DSP 213 goes to step 902. If the channel parameter n is greater than 16, the DSP 213 returns to step 714.

In accordance with the subroutine as described above, the lower PCM byte data of the data memory word of 16 processing channels is transmitted. Thereafter, the DSP 213 goes to step 714 to increment the interrupt counter value INT by 1 and then returns to step 706.

As described above, in the electronic exchange system of the present invention, the main processor controls a plurality of voice announcement devices and the voice announcement devices variably edit or reproduce the voice announcement message under the control of the main processor, enabling an effective voice announcement function.

While there has been illustrated and described what is considered to be a preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A voice announcement device of an electronic exchange system having a main processor for controlling a voice announcement function and a time switch for switching a voice announcement message to a subscriber interface unit, the voice announcement device comprising:

a voice memory for storing coded data corresponding to words and pauses;

a processor interface unit connected to said main processor, for interfacing a voice announcement command output from said main processor;

a buffer unit connected to said processor interface unit, for buffering information for performing a voice announcement with said main processor;

a digital signal processing unit connected to said buffer unit, for controlling said voice memory to access corresponding words and pauses if said voice announcement command has been received, thereby reproducing a voice announcement message;

an output means connected to said time switch via a sub highway, for outputting said voice announcement message to said sub highway under the control of said digital signal processing unit;

a memory interface control signal generator for generating various memory control signals for controlling the voice memory under the control of the digital signal processing unit; and said output means comprising a sub highway interface unit and an output monitor unit; and said output monitor unit comprising a binary switch, manually controllable by a user, and connected to a comparator, said user selecting a time slot number by operating said binary rotary switch; a pair of count frequency dividers connected to said comparator and receiving clock signals from said digital signal processing unit; a PCM code/decode means for receiving an output from said comparator and converting same into a voice signal output to a handset jack, a user being able to hear said voice signal by plugging a handset into said handset jack.

2. The voice announcement device as claimed in claim 1, said digital signal processing unit comprising means for analyzing said voice announcement command, tabling the words from said voice memory in the order of a sentence in accordance with a result of the analysis and inserting a proper length of pauses into the tabled sentence, thereby reproducing said voice announcement message.

3. The voice announcement device as claimed in claim 1, further comprising a data memory for temporarily storing data generated while performing the voice announcement.

4. The voice announcement device as claimed in claim 3, said data memory comprising a static random access memory.

5. The voice announcement device as claimed in claim 3, further comprising a memory interface control signal generator for generating various memory control signals for controlling the operation of said data memory under the control of said digital signal processing unit.

6. The voice announcement device as claimed in claim 1, further comprising a program memory for storing a program for performing the voice announcement function of the voice announcement device.

7. The voice announcement device as claimed in claim 6, said program memory comprising a programmable read only memory.

8. The voice announcement device as claimed in claim 6, further comprising a memory interface control signal generator for generating various memory control signals for controlling the operation of said program memory under the control of said digital signal processing unit.

9. The voice announcement device as claimed in claim 1, said buffer unit comprising a random access memory.

10. The voice announcement device as claimed in claim 9, said random access memory comprising a static random access memory.

11. The voice announcement device as claimed in claim 9, further comprising a memory interface control signal generator for generating various memory control signals for controlling the operations of the buffer random access memory under the control of the digital signal processing unit.

12. The voice announcement device as claimed in claim 1, further comprising a clock supervisory and reset means for providing a reset signal to said digital signal processing unit.

13. The voice announcement device as claimed in claim 12, said clock supervisory and reset means comprising a pair of pulse generators for receiving clock signals from said output means and for providing outputs to input terminals of a first logical and AND gate; and output of said first AND gate providing one input to a second AND gate, said second AND gate having another input connected to a reset line from said main processor; said second and gate having an output connected to an input of a first NAND gate having another input connected to a manual reset switch, said manual reset switch being operable by a user to manually generate a reset signal; an output of said first NAND gate feeding a logic gate which performs a logic inversion, said logic gate having an output of said reset signal which is fed to said digital signal processing unit.

14. A method of servicing a voice announcement in an electronic exchange system in which a plurality of voice announcement devices are controlled by a main processor, comprising:
- a first step of analyzing information of a connection request control field and a voice announcement data field which has been transmitted from said main processor, synthesizing corresponding voice data from a voice memory according to a result of the analysis, converting it into a voice announcement message and then transmitting said voice announcement message to corresponding channel of a sub highway;
- a second step of compulsorily stopping the transmission of said voice announcement message if a release request control field has been transmitted from said main processor; and
- a third step of repeating the transmission of test data of a voice announcement to a designated channel if a test request and test data field information has been transmitted from said main processor.

15. The voice announcement servicing method as claimed in claim 14, wherein said first step comprises the steps of analyzing said data field, tabling the words from said voice memory in the order of a sentence according to the result of the analysis, inserting a proper length of pauses into the tabled sentence and reproducing said voice announcement message.

16. The voice announcement servicing method as claimed in claim 14, further comprising temporarily storing data generated while performing the voice announcement in a memory.

17. The voice announcement servicing method as claimed in claim 14, further comprising temporarily storing data generated while performing the voice announcement in a static random access memory.

18. The voice announcement servicing method as claimed in claim 14, further comprising storing a program for performing the voice announcement function of the voice announcement device in a program memory.

19. The voice announcement servicing method as claimed in claim 14, further comprising storing a program for performing the voice announcement function of the voice announcement device in a programmable read only program memory.

20. The voice announcement servicing method as claimed in claim 14, further comprising generating various memory control signals for controlling the voice memory under the control of a digital signal processing unit.

21. The voice announcement servicing method as claimed in claim 14, said first step comprising:
- initializing external and internal memories and various data parameters and initializing pulse code modulation data of each channel as voiceless sound;
- entering an interrupt service routine and setting the frequency of an interrupt counter to one and checking whether the interrupt is odd or even;
- if the interrupt is determined to be odd, transmitting upper pulse code modulation byte data of data memory words of sixteen processing channels and if interrupt is determined to be even, then transmitting lower pulse code modulation byte data of data memory words of sixteen processing channels;
- adding one to the interrupt counter and then returning to the step of determining whether the interrupt is odd or even.

22. The voice announcement servicing method as claimed in claim 21, the step of transmitting upper pulse code modulation byte data comprising;
- setting a channel parameter n equal to one;
- determining if test data has been transmitted and if test data has been transmitted then storing test data at a serial port and then proceeding to a complete nth channel processing and if test data has not been transmitted then incrementing a pulse code modulation data transmission designation address;
- determining if one word of phase unit transmission has been completed and if so, storing pulse code modulation data for serial transmission and then proceeding to the complete nth channel processing step and if not determining if the first announcement has been transmitted and if so, resetting a start address for a second announcement transmission and proceeding to a step of storing one word or phrase unit transmission completion and if not setting memory data for voiceless sound transmission and then proceeding to the step of storing one word or phrase unit transmission completion and then proceeding to the complete nth channel processing step;
- adding one to the channel parameter n and determining if n is greater than sixteen and if so returning to the step of incrementing the interrupt counter value by one and if not returning to the step of determining if test data has been transmitted.

23. The voice announcement servicing method as claimed in claim 21, said step of transmitting lower pulse code modulation byte data comprising setting a channel parameter n to one and checking to determine if one phrase unit transmission has been completed and if not proceeding to a complete nth channel processing step and if so determining if one sentence transmission has been completed and if not setting processing position for designating word unit of following phrase and then proceeding to the complete nth channel processing step and if so adjusting processing address to transmit the word of first phrase unit of one sentence;
- determining if second sentence transmission has been completed and if not storing the information informing that the second sentence should be transmitted and proceeding to the complete nth channel processing step and if so storing the information that the transmission of the second sentence of service channel has been completed and proceeding to the complete nth channel processing step;

adding one to the channel parameter n and then determining if n is greater than sixteen and if so, returning to the step of incrementing the interrupt by one if not returning to the step of determining if one phrase unit transmission has been completed.

24. A voice announcement device of an electronic exchange system having a main processor for controlling a voice announcement function and a time switch for switching a voice announcement message to a subscriber interface unit, the voice announcement device comprising:

a voice memory for storing coded data corresponding to words and pauses;

a processor interface unit connected to said main processor, for interfacing a voice announcement command output from said main processor;

a buffer unit connected to said processor interface unit, for buffering information for performing a voice announcement with said main processor;

a digital signal processing unit connected to said buffer unit, for controlling said voice memory to access corresponding words and pauses if said voice announcement command has been received, thereby reproducing a voice announcement message;

an output means connected to said time switch via a sub highway, for outputting said voice announcement message to said sub highway under the control of said digital signal processing unit;

a clock supervisory and reset means for providing a reset signal to said digital signal processing unit; said clock supervisory and reset means comprising a pair of pulse generators for receiving clock signals from said output means and for providing outputs to input terminals of a first logical and AND gate; and output of said first AND gate providing one input to a second AND gate, said second AND gate having another input connected to a reset line from said main processor; said second and gate having an output connected to an input of a first NAND gate having another input connected to a manual reset switch, said manual reset switch being operable by a user to manually generate a reset signal; an output of said first NAND gate feeding a logic gate which performs a logic inversion, said logic gate having an output of said reset signal which is fed to said digital signal processing unit.

25. The voice announcement device as claimed in claim 24, said digital signal processing unit comprising means for analyzing said voice announcement command, tabling the words from said voice memory in the order of a sentence in accordance with a result of the analysis and inserting a proper length of pauses into the tabled sentence, thereby reproducing said voice announcement message.

26. The voice announcement device as claimed in claim 24, further comprising a data memory for temporarily storing data generated while performing the voice announcement.

27. The voice announcement device as claimed in claim 26, said data memory comprising a static random access memory.

28. The voice announcement device as claimed in claim 24, further comprising a program memory for storing a program for performing the voice announcement function of the voice announcement device.

29. The voice announcement device as claimed in claim 28, said program memory comprising a programmable read only memory.

30. The voice announcement device as claimed in claim 24, said buffer unit comprising a random access memory.

31. The voice announcement device as claimed in claim 30, said random access memory comprising a static random access memory.

32. The voice announcement device as claimed in claim 30, further comprising a memory interface control signal generator for generating various memory control signals for controlling the operations of the buffer random access memory under the control of the digital signal processing unit.

33. The voice announcement device as claimed in claim 26, further comprising a memory interface control signal generator for generating various memory control signals for controlling the operation of said data memory under the control of said digital signal processing unit.

34. The voice announcement device as claimed in claim 28, further comprising a memory interface control signal generator for generating various memory control signals for controlling the operation of said program memory under the control of said digital signal processing unit.

35. The voice announcement device as claimed in claim 24, further comprising a memory interface control signal generator for generating various memory control signals for controlling the voice memory under the control of the digital signal processing unit.

36. The voice announcement device as claimed in claim 35, said output means comprising a sub highway interface unit and an output monitor unit.

37. An apparatus for servicing a voice announcement in an electronic exchange system in which a plurality of voice announcement devices are controlled by a main processor, said apparatus comprising:

a first means for analyzing information of a connection request control field and a voice announcement data field which has been transmitted from said main processor, synthesizing corresponding voice data from a voice memory according to a result of the analysis, converting it into a voice announcement message and then transmitting said voice announcement message to corresponding channel of a sub highway;

a second means for compulsorily stopping the transmission of said voice announcement message if a release request control field has been transmitted from said main processor; and a third means for repeating the transmission of test data of a voice announcement to a designated channel if a test request and test data field information has been transmitted from said main processor.

38. The voice announcement servicing apparatus as claimed in claim 37, wherein said first means comprises means for analyzing said data field, tabling the words from said voice memory in the order of a sentence according to the result of the analysis, inserting a proper length of pauses into the tabled sentence and reproducing said voice announcement message.

39. The voice announcement servicing apparatus as claimed in claim 37, further comprising means for temporarily storing data generated while performing the voice announcement in a memory.

40. The voice announcement servicing apparatus as claimed in claim 37, further comprising means for temporarily storing data generated while performing the voice announcement in a static random access memory.

41. The voice announcement servicing apparatus as claimed in claim 37, further comprising means for storing a program for performing the voice announcement function of the voice announcement device in a program memory.

42. The voice announcement servicing apparatus as claimed in claim 37, further comprising means for storing a program for performing the voice announcement function of the voice announcement device in a programmable read only program memory.

43. The voice announcement servicing apparatus as claimed in claim 37, further comprising means for generating various memory control signals for controlling the voice memory under the control of a digital signal processing unit.

44. The voice announcement servicing apparatus as claimed in claim 37, said first means comprising:

- a means for initializing external and internal memories and various data parameters and initializing pulse code modulation data of each channel as voiceless sound;
- a means for entering an interrupt service routine and setting the frequency of an interrupt counter to one and checking whether the interrupt is odd or even;
- a means for transmitting, if the interrupt is determined to be odd, transmitting upper pulse code modulation byte data of data memory words of sixteen processing channels and, if interrupt is determined to be even, then lower pulse code modulation byte data of data memory words of sixteen processing channels; and
- a means for adding one to the interrupt counter and then returning the operation to the means for determining whether the interrupt is odd or even.

45. The voice announcement servicing apparatus as claimed in claim 44, the means for transmitting upper pulse code modulation byte data comprising;

- a means for setting a channel parameter n equal to one;
- a means for determining if test data has been transmitted and if test data has been transmitted then storing test data at a serial port and then proceeding to a complete nth channel processing and if test data has not been transmitted then incrementing a pulse code modulation data transmission designation address;
- a means for determining if one word of phase unit transmission has been completed and if so, storing pulse code modulation data for serial transmission and then proceeding to the complete nth channel processing step and if not determining if the first announcement has been transmitted and if so, resetting a start address for a second announcement transmission and proceeding to a step of storing one word or phrase unit transmission completion and if not setting memory data for voiceless sound transmission and then returning the operation to the means for storing one word or phrase unit transmission completion and then completing the nth channel processing;
- a means for adding one to the channel parameter n and determining if n is greater than sixteen and if so returning the operation to the means for incrementing the interrupt counter value by one and if not returning the operation to the means for determining if test data has been transmitted.

46. The voice announcement servicing apparatus as claimed in claim 44, said means for transmitting lower pulse code modulation byte data comprising means for setting a channel parameter n to one and checking to determine if one phrase unit transmission has been completed and if not proceeding to completing nth channel processing and if so determining if one sentence transmission has been completed and if not setting processing position for designating word unit of following phrase and then proceeding to completing nth channel processing and if so adjusting processing address to transmit the word of first phrase unit of one sentence;

- a means for determining if second sentence transmission has been completed and if not storing the information informing that the second sentence should be transmitted and proceeding to completing nth channel processing and if so storing the information that the transmission of the second sentence of service channel has been completed and proceeding to completing nth channel processing; and
- a means for adding one to the channel parameter n and then determining if n is greater than sixteen and if so, returning the operation to the means for incrementing the interrupt by one if not returning the operation to the means for determining if one phrase unit transmission has been completed.

* * * * *